United States Patent [19]

Myers et al.

[11] Patent Number: 5,695,722
[45] Date of Patent: Dec. 9, 1997

[54] CATALYST HEATER ASSEMBLY

[75] Inventors: Stephen Joe Myers, Owosso; Theodore Rogers Turner, Jr., Flint; Barry Odell Christenson, Fenton; Albert Hunter Mayfield, Swartz Creek; John Eric Kreucher, Davison; Charles Scott Nelson, Clio, all of Mich.

[73] Assignee: General Motors Corporation, Detroit, Mich.

[21] Appl. No.: 645,311

[22] Filed: May 13, 1996

[51] Int. Cl.$^6$ ................................ F01N 3/10; H05B 3/00
[52] U.S. Cl. .................... 422/174; 422/173; 422/199; 60/300; 219/536; 219/552; 382/485; 55/DIG. 30
[58] Field of Search ........................ 422/171, 173, 422/174, 177, 180, 199, 211, 222; 60/300; 219/552, 553, 543, 536; 382/485; 55/DIG. 30

[56] References Cited

U.S. PATENT DOCUMENTS 5,526,462 6/1996 Kondo et al. ................. 422/180

FOREIGN PATENT DOCUMENTS 687807 12/1995 European Pat. Off. .

*Primary Examiner*—Hien Tran
*Attorney, Agent, or Firm*—Anthony Luke Simon

[57] ABSTRACT

A catalyst heater assembly for use in a catalytic converter comprising: an electric heater through which a flow of gas passes, wherein the electric heater heats the gas; a plurality of legs around an exterior of the heater, each leg extending in an axial direction toward a flow inlet of the catalytic converter; a flow tube having an inlet end and an outlet end, wherein each of the legs is attached to an exterior peripheral surface of the outlet end and wherein the inlet end is mounted at the flow inlet of the catalytic converter.

8 Claims, 4 Drawing Sheets

CATALYST HEATER ASSEMBLY

This invention relates to a catalyst heater assembly.

BACKGROUND OF THE INVENTION

In certain catalytic converter systems, it may be desirable to include an auxiliary heater useful at engine start-up to decrease the amount of time it takes for the converter catalyst to reach light off temperature. In one known example, an electric heater such as a resistively heated honeycomb structure is placed in the exhaust flow path immediately preceding the catalytic converter. As exhaust gas flows through the heater, the heater transfers heat to the exhaust gas. The engine exhaust then flows directly to the catalytic converter catalyst and transfers the heat from the engine and from the electric heater to the catalytic converter catalyst to bring the converter up to light-off temperature. Such electric heaters are available for sale, for example, from NGK, Japan.

In one known example for mounting the electric heater, the heater is constructed with a series of arcuately spaced legs around the radial periphery of the heater housing. The legs are welded to the interior of the converter shell to maintain the heater in place.

SUMMARY OF THE PRESENT INVENTION

It is an object of this invention to provide a catalyst heater assembly.

Advantageously, this invention provides a catalyst heater assembly for use in a catalytic converter that isolates the heater from the exterior shell of the catalytic converter, reducing heat flow from the heater to the shell of the catalytic converter, increasing efficiency of the heater implementation. It is a further advantage of this invention that the catalyst heater assembly efficiently directs exhaust gas flow through the electric heater, increasing the efficiency of the heater in heating the exhaust gas.

In yet another advantage according to this invention, the catalyst heater assembly is provided with an improved electrode configuration, decreasing the space required by the electrodes and allowing the catalytic converter to fit within a space allocated for a conventional catalytic converter not requiring supplemental heating.

Advantageously, this invention provides a catalyst heater assembly that allows for improved assembly by inherently shielding the electric heater from weld spatter when the heater is welded in place, preventing damage to the heater structure that may otherwise reduced the electrical and air flow efficiency of the heater.

Advantageously, this invention provides a catalyst heater assembly for a catalytic converter that can be implemented as a universal unit configurable for a variety of catalytic converter systems.

Advantageously, according to a preferred example of this invention, a catalyst heater assembly for use in a catalytic converter is provided comprising: an electric heater through which a flow of gas passes, wherein the electric heater heats the gas; a plurality of legs around an exterior of the heater, each leg extending in an axial direction towards a flow inlet of the catalytic converter; and a flow tube having an inlet end and an outlet end, wherein each of the legs is attached to an exterior peripheral surface of the outlet end and wherein the inlet end is mounted at the flow inlet of the catalytic converter.

The advantage that allows the unit to be universal in nature arises from the flow tube, which is preferably fabricated from metal. The inlet end of the flow tube can be sized at the inlet to match the flow inlet diameter of a variety of different catalytic converters. Thus, a single heater and flow tube unit can be installed in a variety of catalytic converters by simply sizing the inlet end of the flow tube as required to fit in the particular catalytic converter.

BRIEF DESCRIPTION OF THE DRAWINGS

The present invention will now be described, by way of example, with reference to the following drawings, in which.

DETAILED DESCRIPTION OF THE INVENTION

Figure 1:
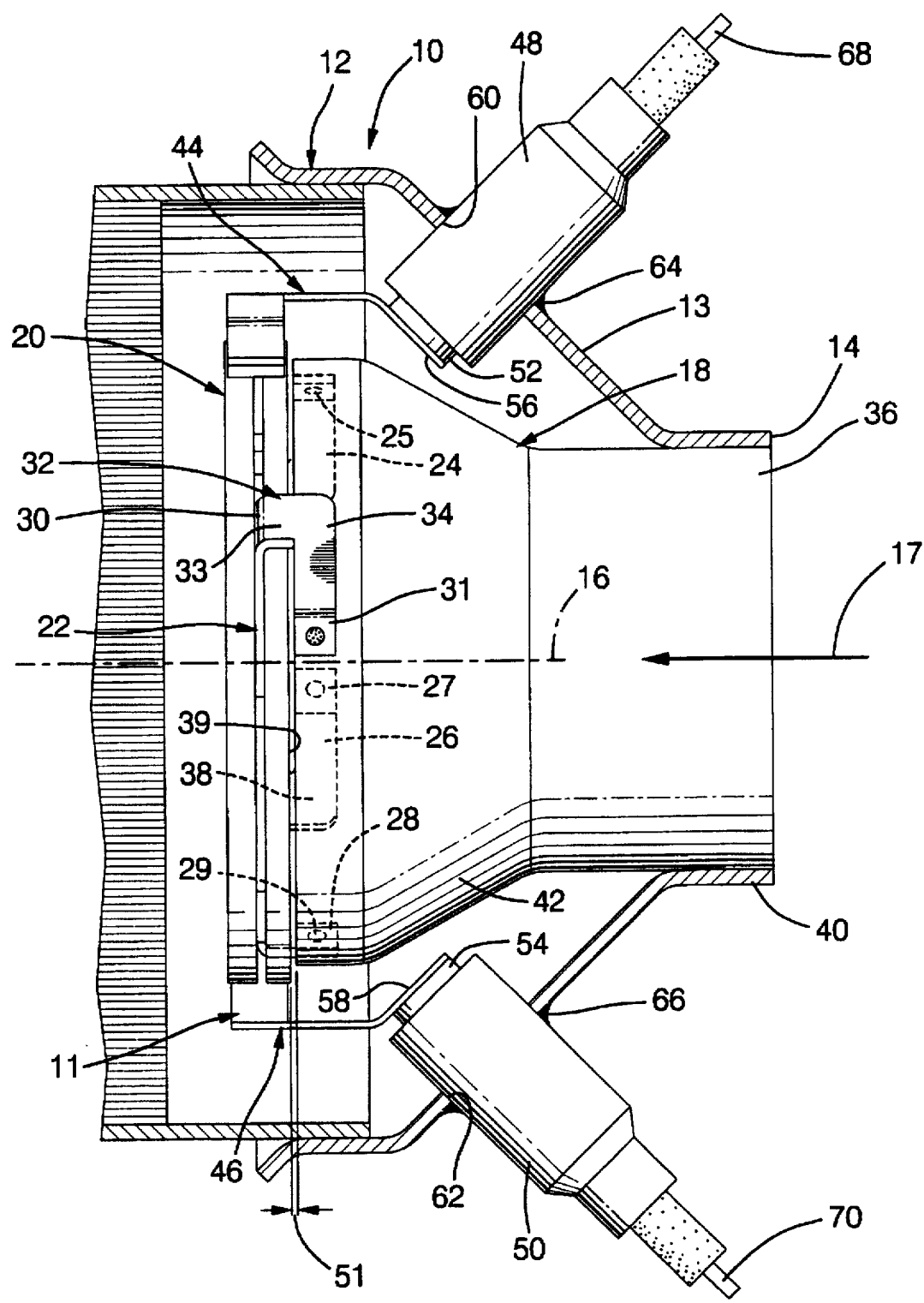
FIGS. 1 and 2 illustrate first and second views of an example implementation of this invention into a front end of a catalytic converter.
Figure 2:
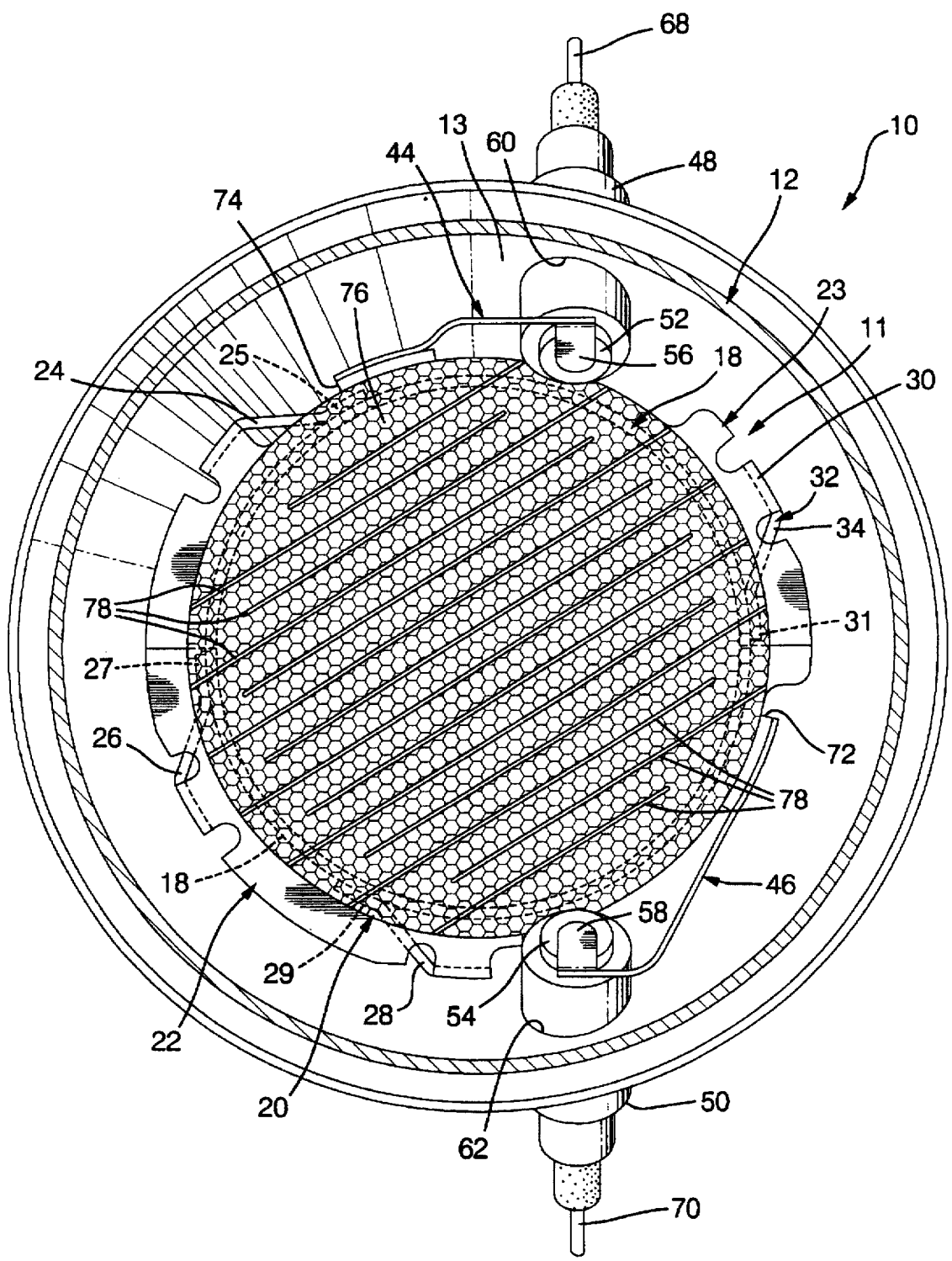

Referring to FIGS. 1 and 2, and includes the heater assembly 11 according to this invention. The heater assembly 11 is housed within the shell 12 of the front end 10 of the catalytic converter and includes electric heater 20 mounted on flow tube 18. Flow tube 18 has an inlet end 36 mounted at the inlet 14 for the catalytic converter front end 10 and a second or outlet end 38 extending into the interior of the shell 12. Inlet end 36 is sized to fit within the reduced diameter portion 40 at inlet 14 of the shell 12 and is held in place either through a friction fit or weld, or any other suitable means.

In the example shown, the heater 20 has two arcuately extending flanges 22 and 23. Off of flange 22, legs 24, 26 and 28 are bent so that they project back in the axial direction parallel to flow axis 16 in the direction of inlet 14. Each leg 24, 26 and 28 has an end 25, 27 and 29 welded to the exterior of the second end 38 of the flow tube 18. Off of flange 23, leg 32 has end 31 also welded to the exterior of the second end 38 of flow tube 18. More particularly, using leg 32 as an example, each leg begins with a bend 30 from the flange 22 and has an axial extending portion 33 projecting in the direction of inlet 14 where inlet end 36 of the flow tube 18 is located. Extending laterally off of each leg at a point distal from the bend 30 is an arm 34, which extends both in an arcuate direction and radially inward from the axial extending portion 33 of the leg. The end 31 of the arm 34 is welded to the outer periphery of the outlet end 38 of the tube 18. The arm 34 and tube 18 are preferrably made of the same material.

The structure shown in FIGS. 1 and 2 provides, according to this invention, an advantage in the process of welding the legs 24, 26, 28, 32 to the tube. In the prior art in which the legs were welded to the inside of the shell, spatter or debris from the weld process, unless shielded by an exterior means, tended to land on the heater structure, damaging some of the honeycomb structure, reducing both the heating efficiency and the flow efficiency of the structure. According to this invention, because the legs 24, 26, 28, 32 are welded to the exterior of the end 38 of the tube 18, the end 38 of the tube 18 inherently acts as a shield that blocks weld spatter from impinging on the honeycomb structure of the heater 20, protecting the heater from possible damage.

As is readily apparent to one skilled in the art, the number of legs and flanges can be easily adjusted by a system designer, however, it is recommended that at least three legs be included to securely mount the heater 20 to the tube 18.

Reference 51 illustrates the distance between the end 38 of the tube 18 and the facing surface 39 of the heater 20. Preferably, according to this invention, the distance 51 is kept to 4 mm or less, and most preferably to 2 mm or less. While, according to this invention, larger distances may be used, the preferred distance of two millimeters or less is recommended to prevent exhaust flow entering the converter in the direction of arrow 17 through the tube 18 from establishing a flow path around the heater 20 and avoiding the beneficial effects of the supplemental heating by the heater 20.

In this example, the heater 20 has two terminals 44 and 46 for connection to a source of electric power that is the source of energy for heater 20. Terminal 44 terminates at a point distal from the heater 20 in end 56 and terminal 46 similarly terminates in end 58. Electrode 48 is mounted in hole 60 in shell 12 by a weld 64 that extends entirely around the periphery of the electrode 48 at the point where the electrode 48 protrudes from the hole 60. The electrode 48 has a metal casing that is insulated from the end contact 52 and from the interior electrical conducting wire carrying power to the heater vis-a-vis end contact 52. The end contact 52 of electrode 48 extends to the interior of the shell 12, and contacts the end 56 of terminal 44. In one example, the electrode 48 extends radially outward from the flow tube 18 at an angle of less than ninety degrees from the axis 16 of the flow tube 18.

Electrode 50, similar to electrode 48, is mounted in hole 62 in shell 12 and held in place by weld 66. Electrode 50 has a contact 54 contacting end 58 of terminal 46. Electric power is provided through wires 68 and 70. Preferably, the electrodes 48 and 50 are circular, cylindrical in shape and the welds 64 and 66 extend completely around the interface between the electrodes 48 and 50 in the holes 60 and 62 in shell 12.

FIG. 2 illustrates contact pads 72 and 74 on the heater 20 that make electrical connection to the terminals 44 and 46, respectively. The contact pads 72 and 74 provide a path for the electrical power supplied by the terminals to the electrically heated element 76 of heater 20. In general, the element 76 is a honeycomb structure either made of metal or having a metal coating that is resistively heated by the electric power provided to the heater. A series of cuts 78 are provided in the element so that the electricity has a zigzag flow path through the element, increasing the impedance thereof to a desirable level for implementation in a vehicle system. The structure and configuration of the heater element and its flanges along with its electrical characteristics are not claimed as part of the invention herein.

As can be seen in FIGS. 1 and 2, the electrodes 48 and 50 are mounted in the shell 12 of the converter at the expanding conical portion 13. This mounting is enabled because the heater 20 is mounted to the flow tube 18 interior of the shell 12 and it offers the advantage that the electrodes 48 and 50 do not extend perpendicularly from the shell 12. This configuration reduces the amount of space required by addition of the electrodes to the system because the electrodes need not extend perpendicularly from the shell and allows implementation of the system into a catalytic converter without necessitating redesign of the space under the floor pan of the vehicle in which the converter is located.

In an alternative mechanization, only one electrode and its corresponding hole in the shell and weldments are necessary. When only one electrode is used, the electrical ground path is provided through the converter shell.

In operation, when the vehicle ignition is turned on, exhaust gas from the engine flows from the engine manifold through one or more exhaust pipes to the converter, including the assembly 10 shown, and enters at the inlet 14. The exhaust gas is directed by the flow tube 18 to the heater 20, which receives electrical power through terminals 48 and 50 from the vehicle electrical system. Electric power to the heater 20 heats the heater, which transfers the heat to the exhaust gas flowing through the heater, increasing the temperature of the exhaust gas. Exhaust gas flows through the heater to the catalyst of the catalytic converter and transfers the heat from the engine and from the heater 20 to the catalyst to quickly bring the catalyst to light-off temperature. Once the catalyst is at light-off temperature, the supply of electricity to the heater 20 may be terminated.

In the example shown, the inlet end 36 of the flow tube 18 is of smaller diameter than the diameter of outlet end 38. This need not be the case and, in fact, the flow tube 18 may be a single flow tube part having its end 36 sized for various catalytic converter implementations. In other examples, the diameter of inlet end 36 may be equal to or greater than the diameter of the outlet end 38.

As can be seen in FIGS. 1 and 2, the heater 20 is not directly mounted to the shell 12, but instead is mounted to the flow tube 18. This mounting structure insulates the heater 20 from the shell 12, allowing the system to be more thermally efficient.

Figure 3:
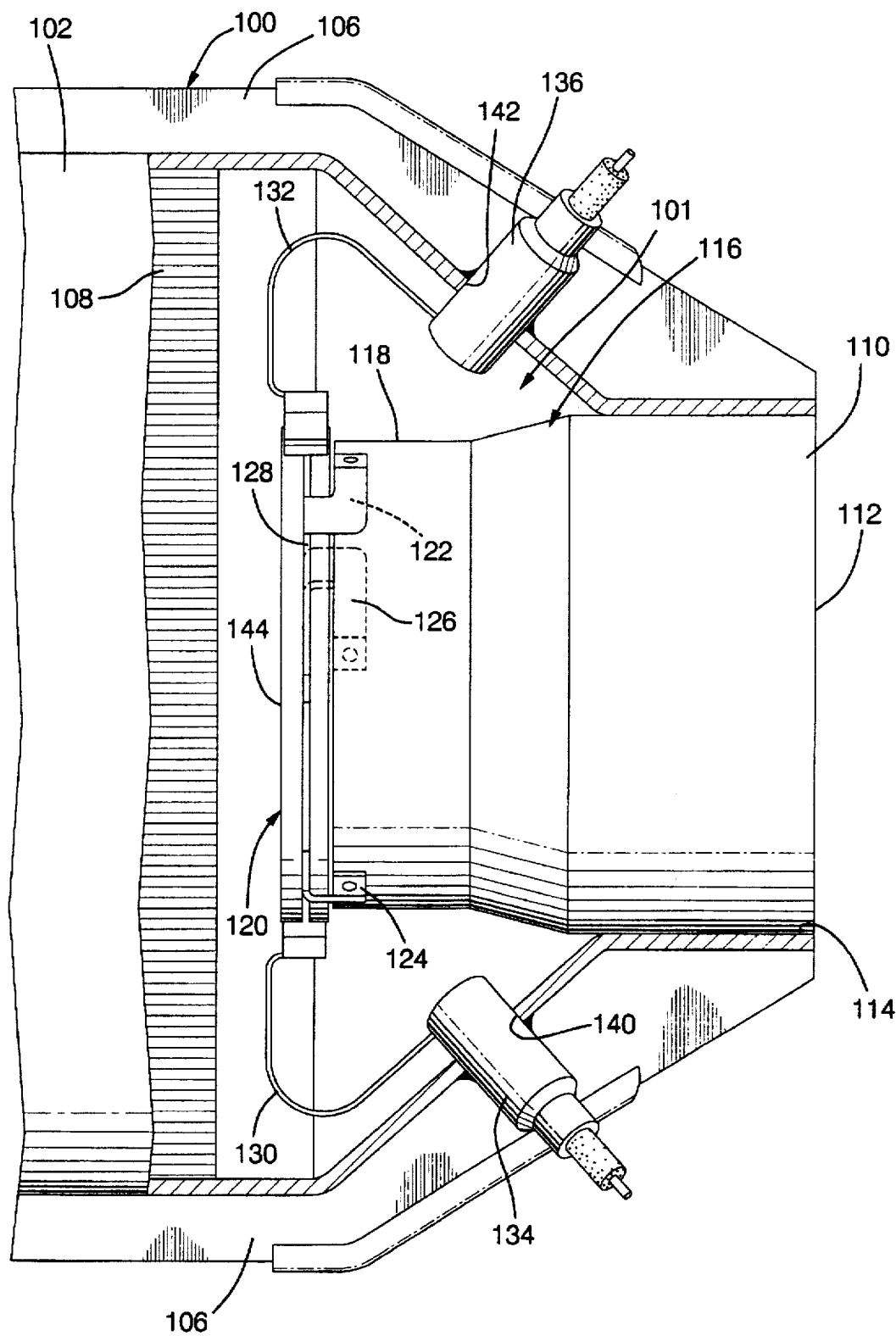
FIGS. 3 and 4 illustrate first and second views of a second example of this invention implemented in a catalytic converter.
Figure 4:
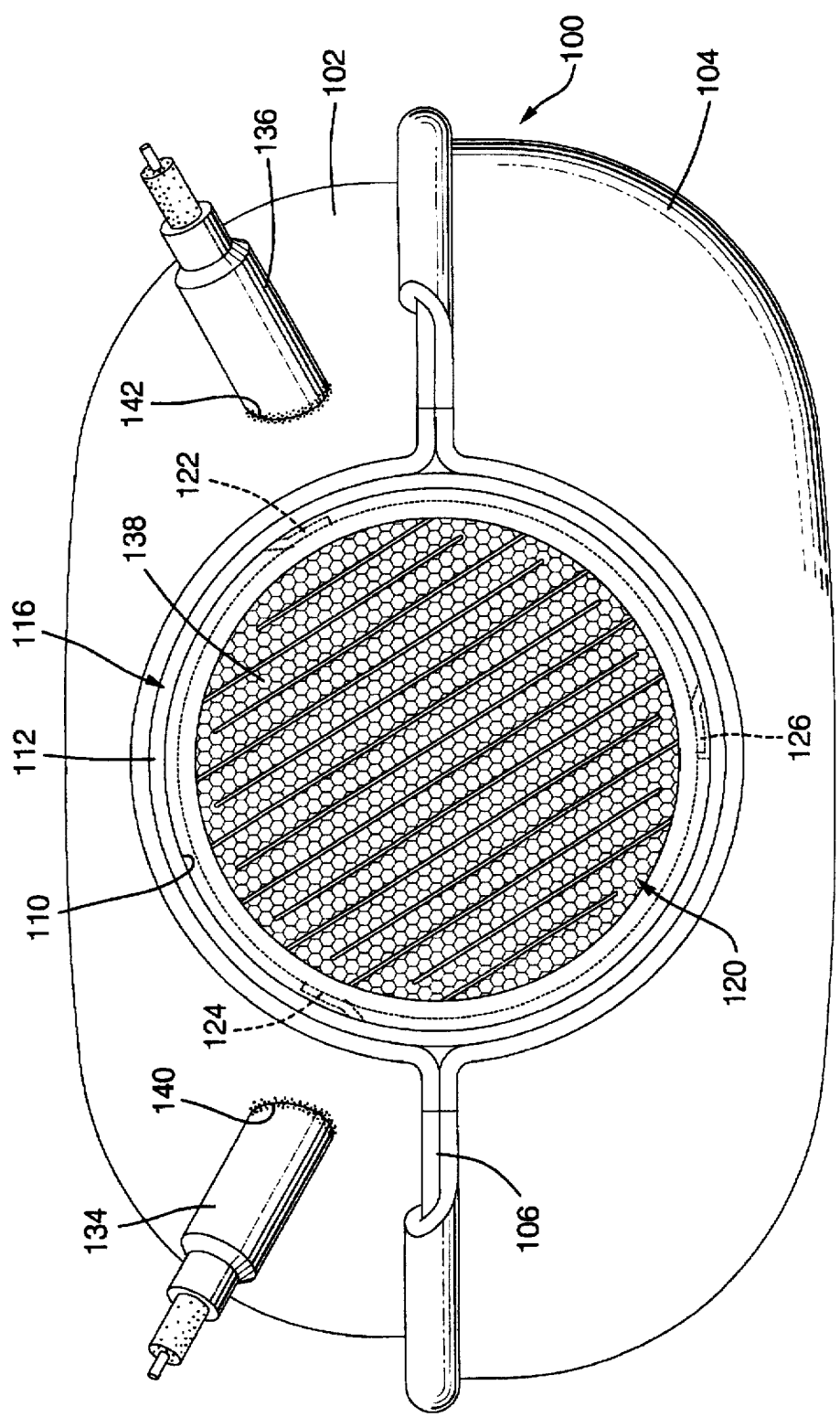

Referring now to FIGS. 3 and 4, a catalytic converter 100 including the heater assembly 101, according to this invention, is shown. The catalytic converter 100 has top and bottom shell halves 102 and 104, welded together at flange 106 to provide the housing for the converter catalyst 108. The converter has an exhaust gas flow inlet 110 through which exhaust gas flows into the converter and into inlet end 112 of flow tube 116. Flow tube 116 is fixedly mounted either by friction fit or by weld or any other suitable mounting technique to surface 114 within the inlet 110. Heater 120 is mounted to the outlet end 118 of flow tube 116 and, as illustrated, includes flange 128 with legs 122, 124 and 126 extending therefrom in a manner similar to the legs 24, 26 28 and 32 shown in FIG. 1.

The legs 122, 124 and 126 have ends welded to the exterior periphery of the outlet end 118 of flow tube 116, maintaining the heater 120 in place. Electrodes 134 and 136 extend through holes 140 and 142 in the top half 102 of the shell of the catalytic converter 100 and provide electricity to power the electrically heated element 138 of heater 120 through terminals 130 and 132.

As shown in FIG. 3, the catalytic converter includes a catalyst 108 of a conventional nature that acts to reduce undesirable exhaust gas species within the vehicle exhaust gas. The catalyst 108 is shown mounted in proximity to the exit surface 144 of the heater 120 so that heat imported onto the exhaust gas by the high temperature of the substrate of the heater 120 is transferred to the catalyst 108 as exhaust gas flows from the heater 120 into the catalyst 108. In this manner, electric power provided to the heater during warm-up of the catalyst 108 decreases the amount of time it takes the catalyst 108 to reach light-off temperature.

We claim:

1. A catalyst heater assembly mounted in a catalytic converter front end, wherein the catalyst heater assembly comprises: an electric heater through which a flow of gas passes, wherein the electric heater heats the gas; a plurality of legs around an exterior of the heater, each leg extending in an axial direction toward a flow inlet of the catalytic converter from end; a flow tube having an inlet end and an outlet end, wherein each of the legs is attached to an exterior peripheral surface of the outlet end and wherein the inlet end is mounted at the flow inlet of the catalytic converter front end.

2. A catalyst heater assembly according to claim 1, also comprising:

a shell having a first end comprising the flow inlet of the catalytic converter front end, wherein the shell has a conical expanding portion within which the heater is located; and at least one electrode extending through a hole in the conical expanding portion, wherein the electrode extends radially outward from the flow tube at an angle of less than ninety degrees from an axis of the flow tube.

3. A catalyst heater assembly according to claim 1, wherein the inlet end of the flow tube has a first diameter different from a second diameter of the outlet end of the flow tube.

4. A catalyst heater assembly according to claim 1, wherein the inlet end of the flow tube has a first diameter less than a second diameter of the outlet end of the flow tube.

5. A catalyst heater assembly according to claim 1 wherein the inlet end of the flow tube has a first diameter greater than a second diameter of the outlet end of the flow tube.

6. A catalyst heater assembly according to claim 1, wherein the electric heater is placed down stream in the gas flow from the flow tube.

7. A catalyst heater assembly according to claim 6, wherein a distance between the heater and the flow tube is no greater than four millimeters.

8. A catalyst heater assembly according to claim 1, wherein the legs are welded to the flow tube and wherein the flow tube acts a shield preventing weld spatter from impinging on the heater.

* * * * *